United States Patent
Blackburn et al.

(10) Patent No.: US 10,683,592 B2
(45) Date of Patent: Jun. 16, 2020

(54) HYBRID WOVEN TEXTILE FOR COMPOSITE REINFORCEMENT

(71) Applicant: Cytec Industries Inc., Woodland Park, NJ (US)

(72) Inventors: Robert Blackburn, Hull (GB); Samuel Jestyn Hill, Wrexham (GB)

(73) Assignee: Cytec Industries Inc., Woodland Park, NJ (US)

( * ) Notice: Subject to any disclaimer, the term of this patent is extended or adjusted under 35 U.S.C. 154(b) by 1006 days.

(21) Appl. No.: 14/824,462

(22) Filed: Aug. 12, 2015

(65) Prior Publication Data
US 2016/0047073 A1 Feb. 18, 2016

(30) Foreign Application Priority Data
Aug. 13, 2014 (GB) .................................. 1414363.0

(51) Int. Cl.
*D03D 13/00* (2006.01)
*D03D 15/00* (2006.01)

(52) U.S. Cl.
CPC .............. *D03D 13/00* (2013.01); *D03D 15/00* (2013.01); *D03D 15/0011* (2013.01); *D03D 15/0088* (2013.01); *D10B 2101/12* (2013.01); *D10B 2331/021* (2013.01); *D10B 2505/02* (2013.01)

(58) Field of Classification Search
CPC ............................... D03D 13/00; D03D 15/00
See application file for complete search history.

(56) References Cited

U.S. PATENT DOCUMENTS

| | | | |
|---|---|---|---|
| 4,680,213 | A | 7/1987 | Fourezon |
| 2006/0213234 | A1 | 9/2006 | Gladfelter et al. |
| 2010/0024489 | A1 | 2/2010 | Lin et al. |
| 2012/0237707 | A1 | 9/2012 | Beraud et al. |

FOREIGN PATENT DOCUMENTS

| | | |
|---|---|---|
| CN | 2928894 | 8/2007 |
| CN | 200964483 Y | 10/2007 |
| EP | 2246179 A2 | 11/2010 |
| JP | 1989201548 | 8/1989 |
| JP | 10-327684 | 12/1998 |
| KR | 20010054758 | 7/2001 |
| WO | 03046057 A1 | 6/2003 |
| WO | 2006/075961 A1 | 7/2006 |
| WO | 2006/075962 A1 | 7/2006 |

OTHER PUBLICATIONS

Definition of "carbon fiber" Random House Unabridged Dictionary (2018) and The American Heritage Science Dictionary (2011), https://www.dictionary.com/browse/carbon-fiber.*
International Search Report. PCT/US2015/044564, dated Oct. 15, 2015.

* cited by examiner

*Primary Examiner* — Andrew T Piziali
(74) *Attorney, Agent, or Firm* — Thi Dang

(57) ABSTRACT

A hybrid, woven textile material that can be used in the manufacturing of fiber-reinforced composite materials. The hybrid textile material is a woven fabric composed of unidirectional fibers interlaced with strips of non-woven fibers in a weaving pattern. In an embodiment, the hybrid textile material is porous or permeable with respect to liquid resins used in Resin Transfer Molding (RTM) processes and a preform formed from this textile material can be infused with liquid resins during such RTM processes.

15 Claims, 5 Drawing Sheets

Uni-weave Architecture

Uni-stitch Architecture

HYBRID WOVEN TEXTILE FOR COMPOSITE REINFORCEMENT

BACKGROUND

Three-dimensional polymer composite parts can be manufactured using different methods, one of which is autoclave molding. In the autoclave molding method, a fabric, usually composed of carbon fibers, is pre-impregnated with a resin matrix. Prepregs are typically laid in a mold and then heated under vacuum to cure the impregnated resin and create the final composite part. The prepregs to be molded into a composite have the advantage of ease of use and high reliability. However, they also have the disadvantage of having limited drapability (i.e. ability to drape).

Another composite manufacturing method is liquid molding. Resin Transfer Molding (RTM) and Vacuum-assisted Resin Transfer Molding (VARTM) are some specific examples. In liquid molding processes, layers of dry reinforcement fibers (without matrix resin) is shaped and compacted into a cohesive, shaped structure called a "preform". This preform is then infused with an uncured liquid resin, often in a closed mold or enclosed vacuum bag. After the resin infusion stage is completed, the resin is cured resulting in a solid composite part. Liquid molding technology is especially useful in the manufacturing complex-shaped structures which are otherwise difficult to manufacture using conventional prepreg technologies. Moreover, dry, flexible fibrous materials used for forming preforms can have significant advantages over standard, resin-impregnated prepreg materials due their longer shelf life and applicability to more complex geometries.

SUMMARY

An object of the present disclosure is to provide a hybrid, woven textile material that can be used in the manufacturing of fiber-reinforced composite materials. The hybrid textile material is a woven fabric composed of unidirectional fibers interlaced with strips of non-woven fibers in a weaving pattern. In an embodiment, the hybrid, woven textile material is porous and permeable with respect to liquid resins used in RTM processes and a preform formed from this woven textile material can be infused with liquid resins during RTM processes.

DETAILED DESCRIPTION

Some available techniques of manufacturing textiles based on unidirectional fibers include: weaving, stitching or bonding.

Figure 1:
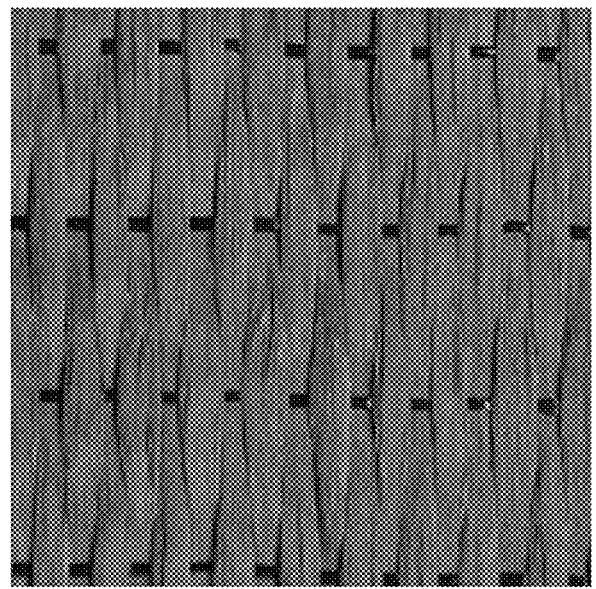
FIG. 1 is a top-view image of a fabric structure based on woven unidirectional configuration, also referred to as Uni-Weave.
Figure 2:
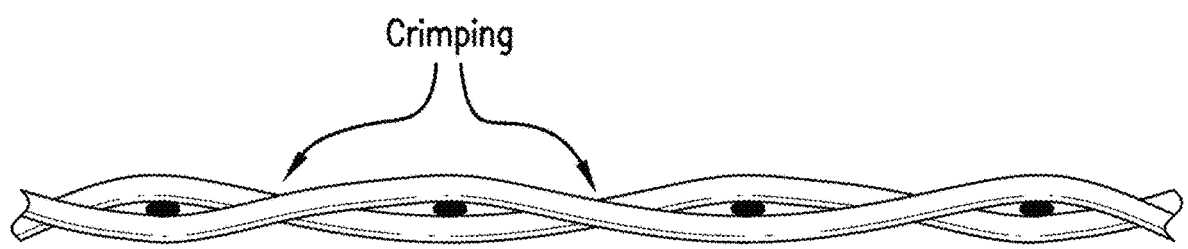
FIG. 2 is a cross-sectional view of the woven fabric shown in FIG. 1, showing crimping.

Woven unidirectional configuration, also referred to as a Uni-Weave, is a weaving approach. Here, ancillary yarns can be woven in the secondary axis in order to anchor the structural fibers in the principal axis. These ancillary yarns are typically fine fibers in order to minimize the fiber crimp. An example of a uni-weave configuration and a crimping model are shown in FIGS. 1 and 2, respectively. Common ancillary fiber types used in this configuration are glass, polyester and co-polyamides. This type of configuration is more suitable for 0° oriented reinforcement fabric but can also be utilized to construct 90° and polar orientated fabrics. Uni-weave fabrics are typically found to have 95% of the fiber mass in the principal orientation and 5% in the secondary orientation. The characteristics found of this type of fabrics are good permeability and drapability (i.e., ability to drape) at the cost of poor textile integrity and low in-plane mechanical properties. Typically 0° tensile and compressive properties are observed to suffer from the crimping effects induced by the weft ancillary fibers. Adjusting the weave pattern of the fabric can help reduce the frequency of the crimping effects yet this typically comes with further reduction to the textile stability. Addressing low stability can be achieved sometimes through thermal treatment in the case of polymer based ancillary yarns or through the addition of a stabilizing media such as powder binders or laminating fleeces but these solutions often will then reduce the permeability of the final fabric and introduce further issues relating to environmental and solvent resistance.

Figure 3:
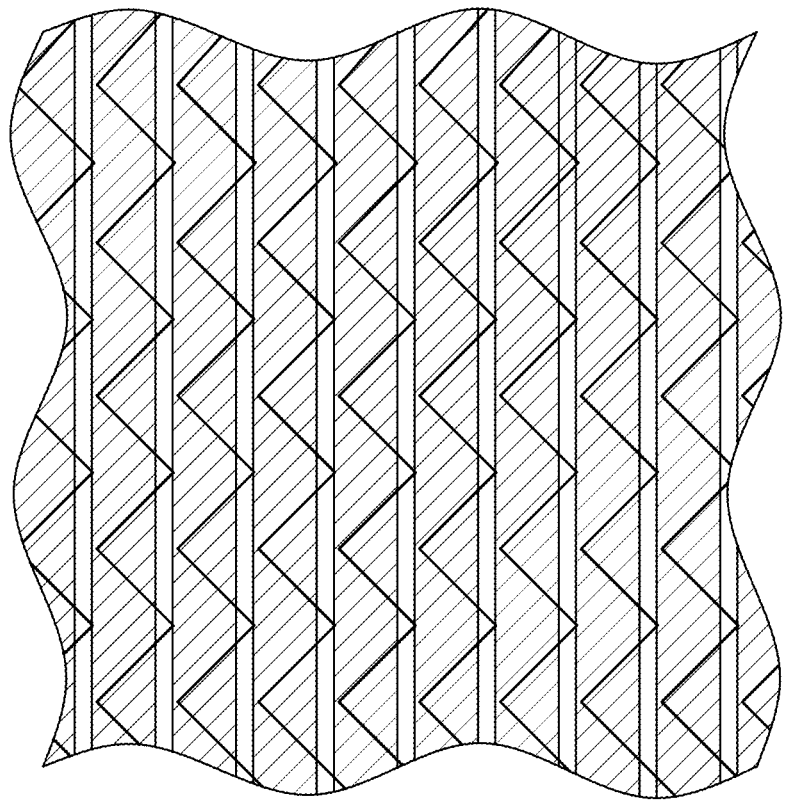
FIG. 3 schematically illustrates a fabric structure based on stitched unidirectional configuration, also referred to as Uni-Stitch.
Figure 4:
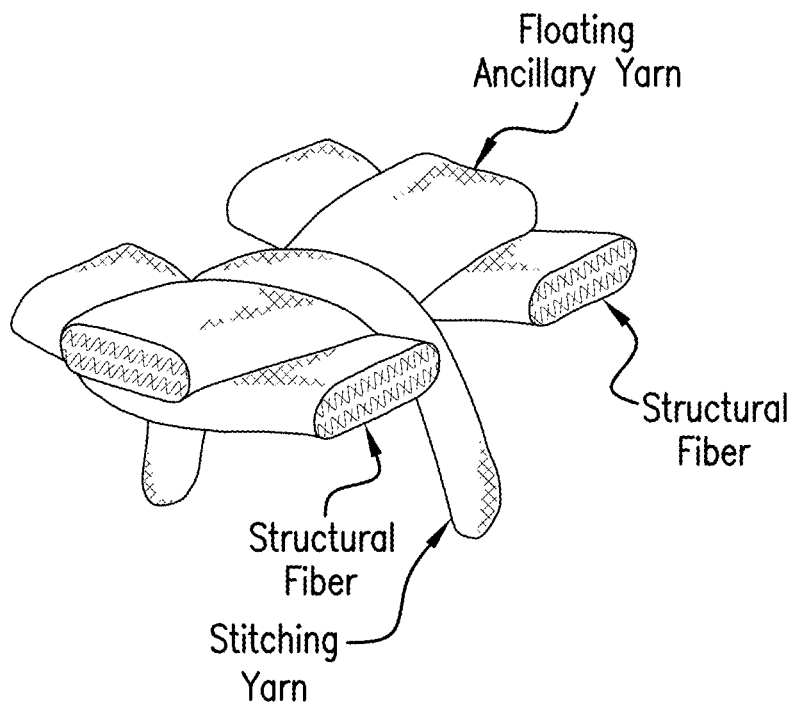
FIG. 4 shows the stitch anchoring mechanism for the fabric structure shown in FIG. 3.

Stitched unidirectional configuration, also referred to as a Uni-Stitch, is based on the use of warp-knitting machines to anchor the structural fibers to the principal axis through the use of a through thickness stich that interlocks with a floating weft ancillary yarn and thus constrains the principal fibers between the stitching thread and ancillary yarn. An example of a uni-stitch configuration and stitch anchoring mechanism are illustrated in FIGS. 3 and 4, respectively. The stitching threads used in this method are typically either polyester or co-polyamide while the ancillary threads are either the same or made of glass, the mass of stitching thread and ancillary yarn in these configurations is typically found to be 2%-6% of the total mass. This type of unidirectional textile is suitable as 0° oriented reinforcement fabric, however, 90° oriented reinforcement may be possible. The uni-stitch configurations typically show an improvement in mechanical performance over woven structures due to a relatively reduced level of out-of-plane crimp but still show reductions when compared to prepreg tape product due to the inter-tow gaps and residual crimp from the stitching. Consequently, the permeability of these fabrics is usually found to be higher than those of their woven equivalents while the handling stability is also improved due to the localized anchoring efficiency of the stitching threads.

Another fabric configuration is that produced by bonding or laminating the unidirectional fibers in place with a polymeric material. Some binding approaches include the use of epoxy binding agents, thermoplastic veils and polymeric yarns. This approach for producing a dry unidirectional architecture undoubtedly provides the closest mechanical performance to that of pre-impregnated tape due to the high levels of fiber alignment and near zero inter-tow gaps that can be achieved. This very high level of fiber nesting though has a significant reduction on the permeability of these fabric configurations where the through-thickness permeability is several orders of magnitude lower than that of the alternative styles. This makes the use of this textile configuration more suitable to narrow unidirectional tapes where permeability tailoring can be achieved within the preform construction. A further issue sometimes observed with these textiles is a lower level of stability is a phenomena known as "fiber wash". This is an effect observed after a resin infusion process where the tow bundles are seen to have in-plane deviation due to the pressure difference at the flow front during the infiltration process causing localized buckling of the fibers. This bonded-type configuration is suitable as 0° oriented reinforcements.

It is typically found that as mechanical properties are increased by reducing fiber crimp and gaps, then permeability, and specifically through thickness permeability, is significantly reduced. In light of the issues seen with dry, unidirectional fibrous products where there is a trade-off between mechanical performance, permeability and textile integrity, a unique hybrid woven textile has been designed to address these issues.

Figure 5:
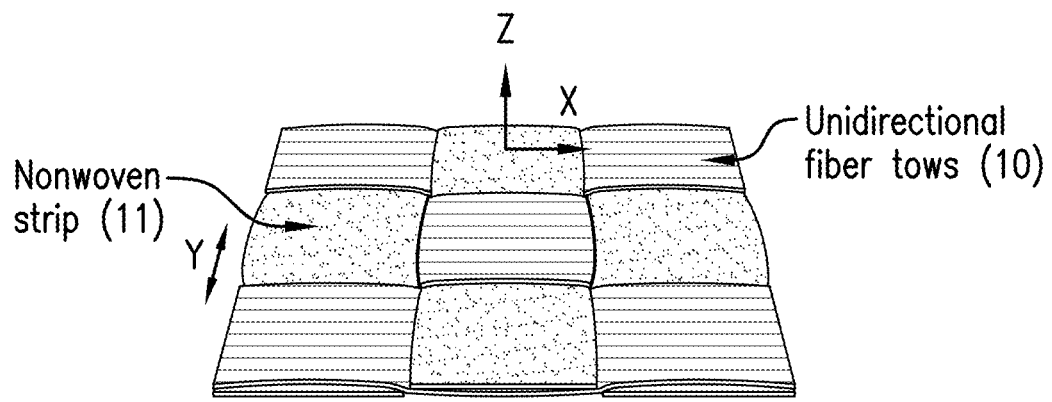
FIG. 5 schematically illustrates a hybrid woven fabric according an embodiment of the present disclosure.
Figure 6:
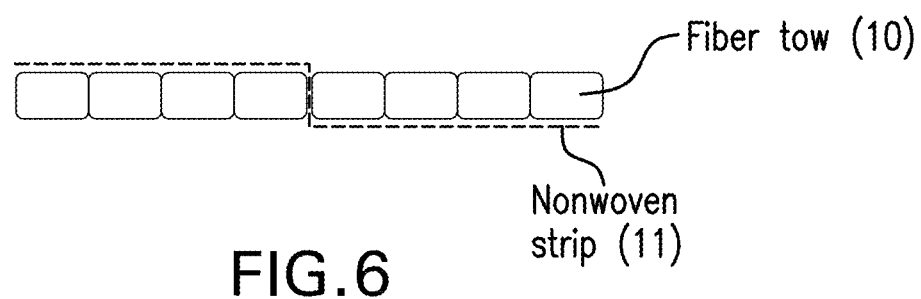
FIG. 6 is a cross-sectional view of the woven fabric shown in FIG. 5.

FIG. 5 depicts an exemplary hybrid woven fabric having unidirectional fibers in the form of continuous fiber tows 10 interlaced with nonwoven strips 11. FIG. 6 is a cross-sectional view of the woven fabric shown in FIG. 5. Referring to FIG. 6, the unidirectional fiber tows 10 are arranged parallel to each other in a sheet-like formation and extending in a first direction, e.g. the warp direction, and the nonwoven strips 11 are extending in a second direction, e.g. the weft direction, transverse to the first direction. Each nonwoven strip floats over multiple tows and then under multiple tows in a weaving pattern. Each fiber tow 10 is a bundle of multiple fiber filaments. The nonwoven strips 11 are formed from a lightweight, nonwoven veil composed of randomly arranged and/or randomly oriented fibers. It is preferred that the nonwoven fibrous veil is a lightweight material with an areal weight of 1 gsm (g/m$^2$) to 40 gsm, more preferably 3 gsm to 10 gsm. Each nonwoven strip is flexible and has a narrow width relative to its length. In one embodiment, the width of the non-woven strip is from 5 mm to 40 mm, preferably 10 mm to 30 mm, and the thickness is from 10 µm to 60 µm (0.01-0.05 mm). The weaving pattern may be of any conventional weaving structure such as plain weave (shown in FIG. 5), satin weave, or twill weave.

As discussed above, the unidirectional fibers are in the form of continuous fiber tows. Each fiber tow is composed of hundreds of smaller continuous fiber filaments. The fiber tows may have 1000 to 100,000 fiber filaments per tow, and in some embodiments, 3000 to 24000 filaments per tow. The fiber filaments may have cross-sectional diameters within the range of 3-15 µm, preferably 4-7 µm. Suitable fibers are those used as structural reinforcement of high-performance composites, such as composite parts for aerospace and automotive applications. The structural fibers may be made from high-strength materials such as carbon (including graphite), glass (including E-glass or S-glass fibers), quartz, alumina, zirconia, silicon carbide, and other ceramics, and tough polymers such as aramids (including Kevlar), high-modulus polyethylene (PE), polyester, poly-p-phenylene-benzobisoxazole (PBO), and hybrid combinations thereof. For making high-strength composite structures, such as primary parts of an airplane, the unidirectional fibers preferably have a tensile strength of greater than 500 ksi. In a preferred embodiment, the unidirectional fibers are carbon fibers.

The unidirectional fibers may be coated with sizing compositions and/or finishes that serve multiple purposes, including facilitating handling, protection of the fibers from compaction and process induced damage, aiding in compatibility and wetting of the fibers by the resin, and overall enhancement of the composites performance.

The nonwoven strips described above may be formed by slitting a larger nonwoven veil and the slit nonwoven material is then used for weaving. The nonwoven veil is composed of intermingled, randomly arranged fibers and a small amount of polymeric binder for holding the fibers together. It is desirable to provide a nonwoven veil having a sufficient amount of binder to hold the fibers together and but the binder amount is small enough to leave the resulting veil porous and permeable to liquid and air, particularly liquid resin. Suitable polymeric binders include poly vinyl alcohol (PVA), polyester, co-polyester, cross-linked polyester, styrene acrylic, phenoxy and polyurethane, combinations and copolymers thereof. Preferably, the amount of binder is 5% to 25% by weight, based on the total weight of the veil. The nonwoven veil is flexible and is self-supporting, meaning that it does not require a supporting carrier. Furthermore, the nonwoven veil is a single-layer material, which is not attached to another layer of fibers. The fibers of the nonwoven veil may be chopped or continuous fiber filaments or combination thereof. The nonwoven fiber materials for the nonwoven veil may be selected from carbon, glass, metals, quartz, polymers and copolymers thereof, hybrids thereof (e.g. carbon/glass hybrid), and combinations thereof. Polymeric materials for the fibers may be selected from: aramid; polyester; polyamides, including aliphatic polyamides, cycloaliphatic polyamides, and aromatic polyamides; polyphthalamide; polyamide-imide; polyarylsufones, including polyethersulfone and polyetherethersulfones; polysulfones; polyphenylene sulfone; polyaryletherketones, including polyetheretherketone and polyetherketoneketone; polyphenylene sulfide; elastomeric polyamides; polyphenylene ether; polyurethane; liquid crystal polymers (LCP); phenoxy; polyacrylonitrile, acrylate polymers, and copolymers thereof. The fibers of the veil may also be metal coated. In a preferred embodiment, the nonwoven strips are composed of carbon fibers.

The majority of the nonwoven fibers have cross-section diameters in the range of about 1 µm to 40 µm, with the major portion of the fibers being more preferably in the range of about 4 µm to 20 µm in diameter.

In one embodiment, the woven fabric (based on the combination of unidirectional fiber tows and nonwoven strips) has an areal weight of 50 gsm to 400 gsm, preferably, 100 gsm to 200 gsm.

The benefit of the hybrid textile material described herein includes: extremely low crimp of the structural fibers due to the low thickness of the nonwoven veil; improved permeability due to the porous structure of the nonwoven strips; improved fracture behavior from the nonwoven strips reinforcing the interlaminar zone of the preform or final composite laminate; improved lay-up efficiency during the preparation of the preform from having off-axis fibers in a continuous textile format; potentially improved handling behavior if the non-woven were to contain a stabilizing binder and the textile laminated. Moreover, the woven fabric disclosed herein could be produced in varying configurations so as to provide 0°, 90°, +θ° or −θ° fiber orientation.

Method of Making Nonwoven Veil

The nonwoven veil discussed above may be produced by a conventional wet-laid process, as an example. In a wet-laid process, wet chopped fibers are dispersed in a water slurry that contains binder(s), surfactant(s), viscosity modifier(s), defoaming agent(s), and/or other chemical agents. Once the chopped fibers are introduced into the slurry, the slurry is intensely agitated so that the fibers become dispersed. The slurry containing the fibers is deposited onto a moving screen where a substantial portion of the water is removed to form a web. The resulting mat is dried to remove any remaining water and to cure the binder(s). The formed non-woven mat/veil is an assembly of dispersed, individual fiber filaments arranged in random orientation. Wet-laid processes are typically used when a uniform distribution of fibers and/or weight is desired.

The final nonwoven veil contains at least about 90 wt. % fibers (excluding sizing/binder chemicals), on a dry basis, e.g. about 93 wt. % to about 99 wt. % fibers, on a dry basis, excluding the sizing/binder.

An additional binder may be applied to the nonwoven veil after it is made but before weaving to improve the veil's stability and to aid preform compaction during the manufacturing of composite parts. Suitable binders for the stabilization of the nonwoven veil include epoxy resins, thermoplastic polymers or a combination thereof. A particularly suitable binder for the stabilization of the nonwoven veil is the polyarylether thermoplast-epoxy binder disclosed in U.S. Pat. No. 8,927,662, the content of which is incorporated herein by reference in its entirety. This binder may be applied in powder form to the veil using a conventional coating technique such as dry-bar coating, whereby dry powder is coated onto a release paper using a roll-over-roll or knife-over-roll coater, and the powder is then transferred on the veil. Another suitable binder for stabilization is the liquid binder composition described in U.S. Pub. No. 2014/0179187, the content of which is incorporated herein by reference in its entirety. Liquid binders disclosed in U.S. patent application Ser. No. 14/750,327, filed on 25 Jun. 2015, are also suitable. The liquid binder may be applied to the veil by dip-coating, as an example.

If the additional binder is used, the total amount of binders in the final veil should not exceed 25% by weight.

Method of Making Hybrid Woven Fabric

The hybrid woven fabric disclosed herein may be manufactured on a standard rapier loom. The unidirectional (e.g. carbon) fibres are spread offline to the correct width based on the FAW requirement. The non-woven is manufactured in a wide form in the process detailed above and slit down to the required width. The spread fibers and non-woven strips are spooled on individual cassettes and mounted onto the loom shaft. Multiple fiber cassettes are required in the warp direction to achieve the targeted textile width while a single cassette of non-woven strip is required as the weft insertion is done individually during the weaving process. As the warp fibers are fed through the loom, the adjacent fibers are pulled in opposite directions (i.e. up or down) and the weft nonwoven strip is pulled through the shed to create the weave pattern. Once the weft nonwoven strip is positioned, the warp fibers are release and pulled under tension to consolidate the weave.

Applications

The hybrid woven textile material disclosed herein is particularly suitable for forming preforms to be used in RTM processes because it is porous and permeable with respect to liquid resins used in such RTM process. To form the preform, multiple plies of textile material are laid up to a desired thickness.

It would be desirable to provide a fiber preform having a binder content which is sufficient to hold the fibers in the desired shape and position but small enough to leave the resulting preform porous so that it can be impregnated with matrix resin during subsequent molding processes. Additionally, it would be desirable to provide a unidirectional fiber preform having improved permeability with respect to the RTM resin to reduce injection time and improve fiber wet out. To that end, the amount of binder in the preform is preferably less than 15% by weight based on the total weight of the preform.

The preform is placed in a closed mold. The mold is heated to a predetermined temperature and a low-viscosity resin is injected into the mold to infuse the preform with the resin. The resin is then cured to form a composite part.

Alternatively, the hybrid woven textile material may be used to form prepregs using conventional resin impregnation techniques.

EXAMPLE

Figure 7:
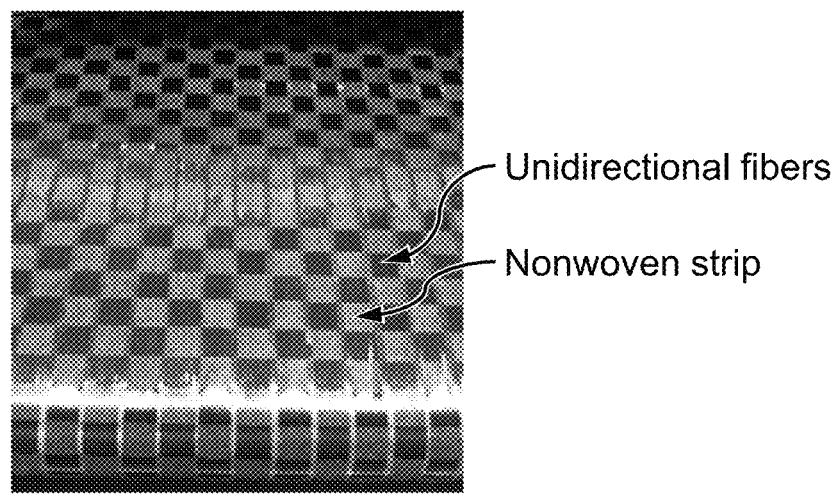
FIG. 7 is photographic image of a plain weave woven fabric made according to one embodiment of the present disclosure

FIG. 7 shows a hybrid veil-woven fabric made according to one embodiment of the present disclosure. Unidirectional carbon fiber tows (IMS65 from Toho Tenax) were woven with strips of nonwoven carbon fibers in a plain weave structure using a conventional weaving process. The carbon tow has a width of 8 mm and the nonwoven carbon strip has a width of 16 mm. The nonwoven carbon strip has an areal weight of 8 gsm and was coated with 5 gsm of Cycom® 7720 binder in powder form (from Cytec Engineered Materials). The woven fabric has an areal weigh of 110 gsm.

Ten (10) plies of the hybrid veil-woven fabric described above were laid up to form a preform. The preform was heated to 130° C. under a vacuum bag in a convection oven for 15 minutes and cooled to 25° C. under vacuum in order to consolidate the plies.

For comparison, two additional preforms were constructed in the same manner using conventional uniweave fabric (supplied by Sigmatex Ltd) and dry unidirectional tape (supplied by Sigamtex Ltd).

Half of the preform was infused with PRISM® EP2400 (from Cytec Engineered Materials) and cured. The resulting composite laminates were then cut into test coupons using a diamond tip cooled saw and tested per EN test method standard on a Zwick test machine. The results from these tests are recorded in Table 1. In Table 1, the laminate codes DT, UW, and VW refer to cured composite laminates which were formed with dry tapes, uniweave fabric, and veilwoven fabric, respectively.

The other part of the preform was used to measure the in-plane permeability performance. The preform was bagged up without any flow assistance to ensure pure in-plane flow behavior. The flow front and volume of resin infused was monitored as a function of time. Also, knowing the viscosity of the resin at the infusion temperature and the achieved fiber volume, the permeability of the preform can be calculated using Darcy's law:

$$K = \frac{X^2 * \eta * FVF}{2 * \Delta\rho * t}$$

where
K=Permeability ($10^{-x}m^2$)
X=Infusion Length (m)
$\eta$=Resin Viscosity (m·Pas)

FVF=Fibre Volume Fraction (%)
Δρ=Pressure Differential (mbar)
t=Time (hrs)

Figure 8:
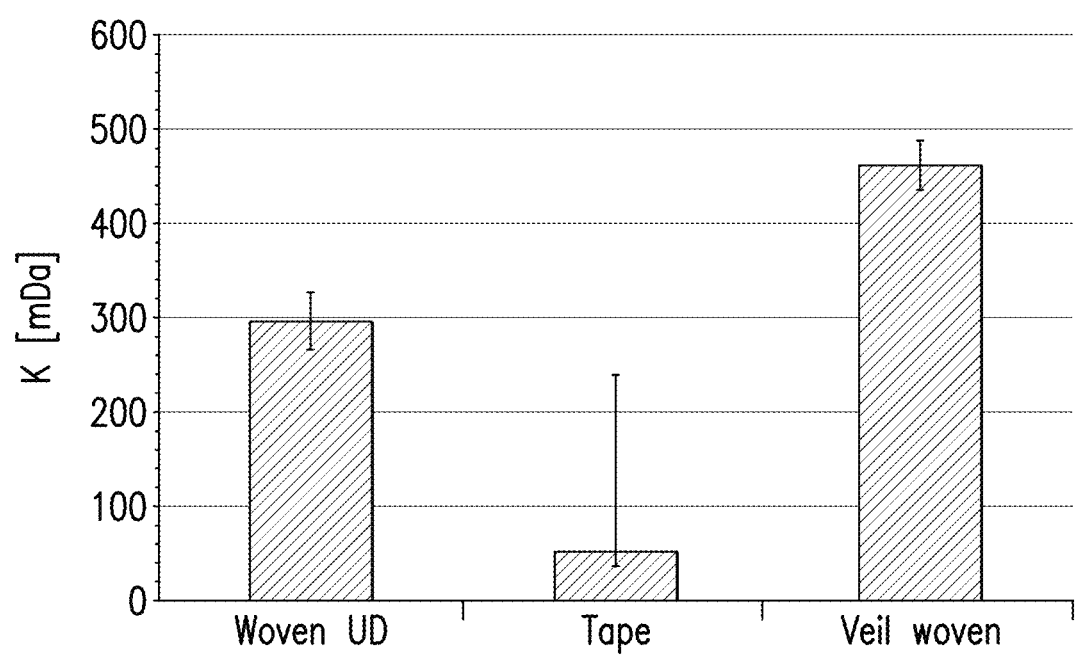
FIG. 8 is a graph showing a comparison of the in-plane permeability performance of three different fabric configurations used in the fabrication of resin-infused preforms.

The results are illustrated in FIG. 8. From FIG. 8, it is evident that the UD tape exhibited a very poor in plane permeability due to the highly aligned fibers restricting resin flow through the preform. In contrast, the woven UD exhibited more crimp resulting in a superior permeability performance. The novel veil-woven configuration exhibited the highest permeability performance due to the inclusion of the nonwoven strips enhancing the flow characteristics within the textile while maintaining the high degree of alignment in the carbon fibers.

The RTM method injects the resin in an in-plane direction from one end side of a dry fiber preform toward the other end side. It has been found that the incorporation of nonwoven carbon fibers in a base fabric structure of unidirectional fibers improved permeability and in-plane properties (0° mechanical performance). Significant increase of permeability was found for the preform formed from the hybrid veil-woven fabric (VW) as compared to preforms formed from dry tapes (DT) and uniweave fabric (UW):

+56% as compared to uni-weave fabric (UW)
+782% as compared to dry tapes (DT).

TABLE 1

| Laminate Code | Property | | Test Method | Properties |
|---|---|---|---|---|
| DT | 0° Tension | Strength (MPa) | EN2561 B | 3137 |
| | | Modulus (GPa) | | 133 |
| | 0° Compression | Strength (MPa) | EN2850 B | 1199 |
| | | Modulus (GPa) | | 116 |
| | Permeability | $K_{XY}$ (mDA) | | 25 |
| UW | 0° Tension | Strength (MPa) | EN2561 B | 2413 |
| | | Modulus (GPa) | | 130 |
| | 0° Compression | Strength (MPa) | EN2850 B | 812 |
| | | Modulus (GPa) | | 96 |
| | Permeability | $K_{XY}$ (mDA) | | 195 |
| VW | 0° Tension | Strength (MPa) | EN2561 B | 3018 |
| | | Modulus (GPa) | | 127 |
| | 0° Compression | Strength (MPa) | EN2850 B | 1290 |
| | | Modulus (GPa) | | 106 |
| | Permeability | $K_{XY}$ (mDA) | | 286 |

What is claimed is:

1. A woven fabric for composite reinforcement comprising:
   unidirectional fiber tows arranged parallel to each other in a sheet-like formation; and
   strips of nonwoven fibers interlaced with the unidirectional fiber tows in a weaving pattern,
   wherein the unidirectional fiber tows are not attached to another layer, and each unidirectional fiber tow is comprised of a plurality of continuous fiber filaments, and
   wherein each strip of nonwoven fibers is a self-supporting, single-layer material, which is not attached to another layer of fibers, and is comprised of randomly arranged and/or randomly oriented fibers.

2. The woven fabric of claim 1 having an areal weight of 50 gsm to 380 gsm.

3. The woven fabric of claim 1, wherein each strip of nonwoven fibers has an areal weight of 2 gsm to 34 gsm.

4. The woven fabric of claim 1, wherein each strip of nonwoven fibers has a width of approximately 5 mm to 40 mm.

5. The woven fabric of claim 1, wherein each strip of nonwoven fibers has a thickness within the range of 10 μm-50 μm (or 0.01-0.05 mm).

6. The woven fabric of claim 1, wherein each unidirectional fiber tow is comprised of 1000 to 100,000 fiber filaments.

7. The woven fabric of claim 1, wherein the unidirectional fiber tows are formed from a high-strength material selected from the group consisting of: carbon, graphite, glass, quartz, alumina, zirconia, silicon carbide, aramid, high-modulus polyethylene (PE), polyester, poly-p-phenylene-benzobisoxazole (PBO), and combinations thereof.

8. The woven fabric of claim 1, wherein the strips of nonwoven fibers comprise fibers made from a material selected from the group consisting of: carbon, glass, metals, quartz, polymers and copolymers thereof, and combinations thereof.

9. The woven fabric according to claim 8, wherein said polymers are selected from: aramid, polyester, polyamide, polyphthalamide, polyamide-imide, polyarylsulfone, polysulfones, polyphenylene sulfone, polyaryletherketone, polyphenylene sulfide, elastomeric polyamide, polyphenylene ether, polyurethane, liquid crystal polymers (LCP), phenoxy, polyacrylonitrile, and acrylate polymers.

10. The woven fabric of claim 1, wherein unidirectional fiber tows are comprised of carbon fibers and the strips of nonwoven fibers comprise randomly arranged and/or randomly oriented carbon fibers.

11. The woven fabric of claim 1, wherein the strips of nonwoven fibers have a sufficient amount of binder to hold the fibers together but allow the strips to be permeable to liquid and gas.

12. The woven fabric of claim 1, wherein the weaving pattern is selected from plain weave, satin weave, and twill weave.

13. The woven fabric of claim 1, wherein the woven fabric is permeable to a liquid resin.

14. A preform adapted for receiving liquid resin in a liquid molding process comprising layers of reinforcement fibers laid up in a stacking arrangement, wherein at least one of the layers of reinforcement fibers is the woven fabric according to claim 1.

15. A composite material comprising the woven fabric according to claim 1 impregnated or infused with a matrix resin.

* * * * *